United States Patent [19]

Doorakian et al.

[11] 4,354,015

[45] Oct. 12, 1982

[54] PHOSPHONIUM BICARBONATE CATALYSTS FOR PROMOTING REACTION OF EPOXIDES WITH PHENOLS

[75] Inventors: George A. Doorakian, Bedford; Lawrence G. Duquette, Maynard, both of Mass.; James L. Bertram, Lake Jackson, Tex.

[73] Assignee: The Dow Chemical Company, Midland, Mich.

[21] Appl. No.: 313,430

[22] Filed: Oct. 21, 1981

Related U.S. Application Data

[63] Continuation-in-part of Ser. No. 231,704, Feb. 5, 1981, abandoned, which is a continuation of Ser. No. 63,894, Aug. 3, 1979, abandoned.

[51] Int. Cl.$^3$ .............................................. C08G 59/68
[52] U.S. Cl. ..................................... 528/89; 525/507; 528/99; 528/100; 528/102; 528/104
[58] Field of Search .................. 528/89, 104, 102, 99, 528/100; 525/507

[56] References Cited

U.S. PATENT DOCUMENTS

| | | | |
|---|---|---|---|
| 3,193,529 | 7/1965 | Oxenrider | 260/47 |
| 3,306,872 | 2/1967 | Maycock et al. | 260/32.8 |
| 3,477,790 | 11/1969 | Dante et al. | 528/89 |
| 3,547,885 | 12/1970 | Dante et al. | 528/112 |
| 3,637,590 | 1/1972 | Maycock et al. | 260/47 EP |
| 3,660,354 | 5/1972 | Uelzmann | 260/47 EC |
| 3,784,583 | 1/1974 | Smith | 528/89 X |
| 3,948,855 | 4/1976 | Perry | 260/47 EP |
| 4,048,141 | 9/1977 | Doorakian et al. | 528/86 X |
| 4,302,574 | 11/1981 | Doorakian et al. | 528/89 |

FOREIGN PATENT DOCUMENTS 893191 2/1972 Canada.

*Primary Examiner*—Earl A. Nielsen
*Attorney, Agent, or Firm*—M. L. Glenn

[57] ABSTRACT

Tetrahydrocarbyl phosphonium bicarbonate salts are described which are unexpectedly effective as catalysts for promoting the reaction between (a) vicinal epoxides and (b) phenols. These catalysts are particularly useful in preparing high molecular weight epoxy resins by the advancement reaction of an epoxy resin with a polyhydric phenol.

13 Claims, No Drawings

PHOSPHONIUM BICARBONATE CATALYSTS FOR PROMOTING REACTION OF EPOXIDES WITH PHENOLS

CROSS-REFERENCE TO RELATED APPLICATION

This is a continuation-in-part of application Ser. No. 231,704, filed Feb. 5, 1981, now abandoned, which is a continuation of application Ser. No. 063,894, filed Aug. 3, 1979, now abandoned.

BACKGROUND OF THE INVENTION

1. Field of the Invention

This invention relates to the use of tetrahydrocarbylphosphonium bicarbonate salts as catalysts for the preparation of epoxy-containing materials. More particularly, this invention pertains to a process for making a linear polymeric material from the advancement reaction of an epoxy resin with a polyhydric phenol (especially bisphenol A) in the presence of a tetrahydrocarbylphosphonium bicarbonate catalyst.

2. Description of the Prior Art

It is well-known in the art to produce hydroxyl-containing ethers by reacting a vicinal epoxide with a compound bearing phenolic hydroxyls in the presence of such catalysts as tertiary amines, quaternary ammonium halides, phosphonium halides and the like. See, for example: U.S. Pat. Nos. 2,216,099; 2,633,458; 2,658,855; 3,377,406; 3,477,990; 3,547,881; 3,547,885; 3,694,407; 3,738,862; 3,948,855; and 4,048,141. Canadian Pat. No. 893,191, German Pat. DT Nos. 2,206,218 and 2,335,199. The texts, *Handbook of Epoxy Resins* by H. Lee and K. Neville, McGraw-Hill (1967) and *Epoxy Resins Chemistry and Technology*, edited by C. A. May and Y. Tanaka, Marcel Dekker, Inc. (1973) are also of interest. It is taught in U.S. Pat. No. 4,048,141 that certain other phosphonium salts promote the reaction between vicinal epoxides and phenols and/or carboxylic acids or anhydrides.

U.S. Pat. No. 3,948,855, issued to Perry, teaches a process for preparing phenolic hydroxy ether compounds by the reaction of phenol and a vinyl epoxide in the presence of a phosphonium salt of an acid, ester or acid ester of the element carbon. However, a phosphonium bicarbonate salt is not disclosed in the formulae representing such phosphonium salts at column 6, lines 30–56, of the patent. Canadian Pat. No. 893,191, also issued to Perry, appears more relevant in that the formulae for the anion of the phosphonium salt disclosed at page 11, lines 1–9, include a bicarbonate anion amongst numerous other anions. However, nothing in this reference suggests that the phosphonium bicarbonate salt would be any more or less effective as a catalyst than the other phosphonium salts more explicitly described in this Canadian patent.

The prior art catalysts for promoting reactions of epoxides with phenols have generally been deficient in one or more aspects. In many instances, the catalysts react with the epoxy reactant and thus preclude the marketing of a blend comprising an epoxy resin and a catalyst, a so-called "precatalyzed epoxy resin." Blends comprising a polyhydric phenol and a catalyst (i.e., a precatalyzed polyhydric phenol) have likewise been generally unavailable due to possible adverse reactions of the two components.

Many prior art catalysts exhibit a lack of selectivity in that they simultaneously promote the reaction of an epoxy resin with both the phenolic hydroxyl group(s) on the reactant and the aliphatic hydroxyl group(s) on the product, which produces branched or cross-linked polymers rather than the desired linear polymers. In still other instances, the molecular weight of the polymer attainable with the catalyst is limited. While a higher loading of catalyst will, up to a point, produce a polymer of a greater molecular weight than lower loadings, a limiting value for the loading is usually reached at which point little additional increase in molecular weight can be obtained by increasing the catalyst loading. These deficiencies have now been remedied by the subject invention.

SUMMARY OF THE INVENTION

It has now been discovered that phosphonium bicarbonate salts are surprisingly effective in selectively and efficiently catalyzing the reaction of vicinal epoxides with phenols to produce substantially linear reaction products. These reaction products are obtained in high yields and are of excellent color. Surprisingly, much higher molecular weights can be attained in the reaction of a vicinal epoxide compound with a polyhydric phenol, if a tetrahydrocarbylphosphonium bicarbonate is employed as a catalyst instead of a like phosphonium salt having a structurally similar, but different, anion. For example, at higher catalyst loadings, a tetrahydrocarbyl phosphonium bicarbonate compound will produce an epoxy resin having a weight average molecular weight at least 25 percent, and in some embodiments 50 percent, greater than that attainable with a like molar quantity of the corresponding phosphonium acetate salt or acetate/acetic acid complex at the same reaction conditions.

The instant catalysts are particularly efficacious in the preparation of resins having a weight-average molecular weight of at least 50,000. Such high molecular weight resins are particularly difficult to make with the prior art phosphonium acetate salts.

Additionally, the novel catalysts are surprisingly unreactive with epoxy resins or polyhydric phenols at conventional storage temperatures. As a result, a precatalyzed epoxy resin can be prepared by blending the subject catalyst with an epoxy resin. In a similar manner, a precatalyzed polyhydric phenol can be prepared by blending the catalyst with a polyhydric phenol. Such precatalyzed epoxy resins or polyhydric phenols are, of course, novel and extremely useful compositions of matter.

DETAILED DESCRIPTION OF THE INVENTION

Phosphonium Bicarbonate Salts

The tetrahydrocarbylphosphonium bicarbonate salts correspond to the formula I

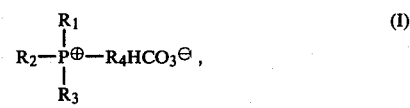

wherein $R_1$, $R_2$, $R_3$ and $R_4$ are each independently hydrocarbyl or inertly-substituted hydrocarbyl radicals, having from 1 to about 20 carbon atoms. The term hydrocarbyl designates a univalent hydrocarbon radical. This hydrocarbyl group can operably bear substituents inert in the reaction catalyzed, for example alkyl, aryl, alkoxy, hydroxyalkyl moieties and the like. $R_1$, $R_2$, $R_3$ and $R_4$ are preferably each independently $C_1$ to $C_{12}$ alkyl groups or phenyl and more preferably are each independently phenyl or $C_1$ to $C_4$ alkyl. Most preferably $R_1$-$R_3$ are each n-butyl or each phenyl and $R_4$ is methyl, ethyl or n-butyl.

Compounds of the formula I are conveniently prepared by reacting at room temperature a tetrahydrocarbylphosphonium halide dissolved in a lower alkanol with an ion-exchange resin (quaternary ammonium hydroxide type), to thereby produce a solution containing the corresponding tetrahydrocarbyl phosphonium hydroxide salt. Carbon dioxide at a positive pressure is then brought into intimate contact with the alkanolic solution of the phosphonium hydroxide salt at room temperature so as to produce the tetrahydrocarbylphosphonium bicarbonate salt. This salt can be readily recovered by distillation at reduced pressure to remove the solvent.

Illustrative examples of the instant class of catalysts include those of formula I wherein $R_1$-$R_4$ are each ethyl, n-butyl, hexyl, octyl, cyclohexyl, phenyl, benzyl, hydroxymethyl, cyanoethyl, and the like. Other illustrative examples include those of formula I in which $R_1$-$R_4$ are different. For example, those in which $R_1$ is n-butyl and $R_2$-$R_4$ are each phenyl.

It is believed that the bicarbonate anion of the phosphonium salt may exchange in situ at reaction conditions with the phenol reactant. It is possible therefore that the phosphonium bicarbonate salt is not itself the catalytic species in the instant reaction, but instead a derivative formed therefrom in situ is the catalyst. Accordingly, the instant invention embraces not only the use of the phosphonium bicarbonate salt as an advancement catalyst but also the use of these in situ derivatives.

EPOXIDE REACTANTS

The vicinal epoxide reactants are organic compounds bearing one or more moieties corresponding to the formula

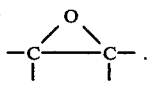

The alkylene oxides of from 2 to about 24 carbon atoms, the epihalohydrins and the epoxy resins are perhaps the best known and most widely used members of the genus. Ethylene oxide, 1,2-propylene oxide, 1,2-butylene oxide and epichlorohydrin are the preferred monoepoxides. These alkylene oxides can be reacted with monohydric phenols to prepare useful alkylene glycol phenyl ethers in the presence of the above-described catalysts. Similarly, monoepoxides can be reacted with carboxylic acids and anhydrides to prepare other useful products.

Polyepoxides are organic compounds possessing more than one 1,2-epoxide group per molecule. The most useful epoxy reactants are these polyepoxides, particularly the epoxy resins. The polyepoxide reactants can operably be saturated or unsaturated, aliphatic, cycloaliphatic, aromatic or heterocyclic in nature. Additionally, the polyepoxides can bear substantially inert substituents, such as alkoxy, haogen, hydroxyl or phosphorus moieties. They also can be monomeric or polymeric.

Various examples of polyepoxides that may be used in the invention are given in U.S. Pat. No. 2,633,458 and it is to be understood that so much of the disclosure of that patent relevant to examples of polyepoxides is incorporated by reference into this specification. The polyepoxides, particularly the polymeric type, are conveniently described in terms of epoxy equivalent values, as defined in U.S. Pat. No. 2,633,458. The polyepoxides used in the subject advancement reaction are those having an epoxy equivalency greater than 1.0.

Other examples of polyepoxides include the glycidyl ethers of novolac resins, i.e., phenol-formaldehyde condensates. Preferred resins of this type are those of the formula:

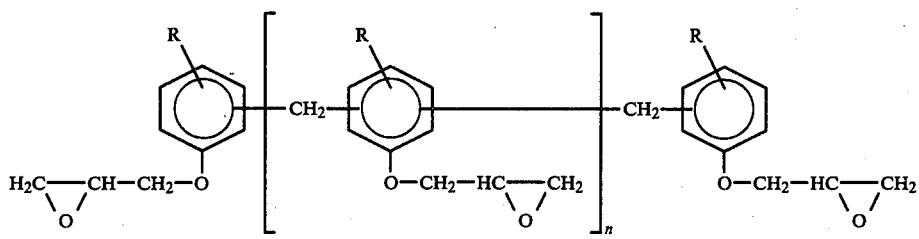

wherein each R independently is hydrogen or an alkyl radical and n has an average value of from about 0.1 to about 10, preferably from about 1 to about 2. Preparation of these polyepoxides is illustrated in U.S. Pat. No. 2,616,099 and U.S. Pat. No. 2,658,885.

The preferred polyepoxides are those represented by the general formula

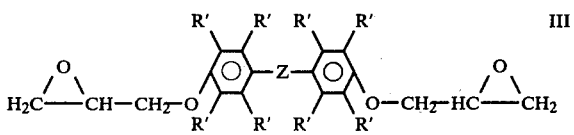

wherein R' at each occurrence is independently selected from hydrogen, bromine and chlorine and wherein Z is selected from oxygen, sulfur, —SO—, —SO$_2$—, bivalent hydrocarbon radicals containing up to about 10 carbon atoms, oxygen-, sulfur- and nitrogen-containing hydrocarbon radicals, such as —O—R'—O—, —OR"—O—R"—O—, —S—R"—S—, or

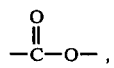

wherein R" is a bivalent hydrocarbon radical. In formula III, Z preferably is an alkylene or alkylidene group having from 1 to about 4 carbon atoms and is most preferably methylene (—CH$_2$—) or isopropylidene (—C(CH$_3$)$_2$—).

Other examples of polyepoxides include the epoxidized esters of the polyethylenically unsaturated monocarboxylic acids, such as epoxidized linseed, soybean, tung, walnut and dehydrated castor oil, methyl linoleate, butyl linoleate, ethyl 9,12-octadecanedioate, butyl 9,12,15-octadecanetrioate, butyl oleostearate, mono- or diglycerides of tung oil, monoglycerides of soybean oil, sunflower oil, rapeseed oil, hempseed oil, sardine oil, cottonseed oil, and the like.

Another group of the epoxy-containing materials suitable for use in the process of this invention include the epoxidized esters of unsaturated monohydric alcohols and polycarboxylic acids, such as, for example, diglycidyl phthalate, diglycidyl adipate, diglycidyl isophthalate, di(2,3-epoxybutyl)adipate, di(2,3-epoxybutyl)oxalate, di(2,3-epoxyhexyl)succinate, di(3,4-epoxybutyl)maleate, di(2,3-epoxyoctyl)pimelate, di(2,3-epoxybutyl)phthalate, di(2,3-epoxyoctyl)tetrahydrophthalate, di(4,5-epoxydodecyl)maleate, di(2,3-epoxybutyl)terephthalate, di(2,3-epoxypentyl)thiodipropionate, di(5,6-epoxytetradecyl)diphenyldicarboxylate, di(3,4-epoxyheptyl)sulfonyldibutyrate, tri(2,3-epoxybutyl)-1,2,4-butanetricarboxylate, di(5,6-epoxypentadecyl)tartrate, di(4,5-epoxytetradecyl)maleate, di(2,3-epoxybutyl)azelate, di(3,4-epoxybutyl)citrate, di(5,6-epoxyoctyl)cyclohexane-1,3-dicarboxylate, di(4,5-epoxyoctadecyl)malonate.

Another group of the epoxy-containing materials include epoxidized esters of unsaturated alcohols and unsaturated carboxylic acids, such as 2,3-epoxybutyl 3,4-epoxypentanoate; 3,4-epoxyhexyl 3,4-epoxypentanoate; 3,4-epoxy-6-methylcyclohexylmethyl 3,4-epoxy-6-methylcyclohexane carboxylate.

Still another group of the epoxy-containing materials includes epoxidized derivatives of polyethylenically unsaturated polycarboxylic acids, such as, for example, dimethyl 8,9,12,13-diepoxyeicosanedioate; dibutyl 7,8,11,12-diepoxyoctadecanedioate; dioctyl 10,11-diethyl-8,9,12,13-diepoxyeicosanedioate; dihexyl 6,7,10,11-diepoxyhexadecanedioate; didecyl 9-epoxyethyl-10,11-epoxyoctadecanedioate; dibutyl 3-butyl-3,4,5,6-diepoxycyclohexane-1,2-dicarboxylate; dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

PHENOLIC REACTANTS

The phenolic reactants are organic compounds having one or more hydroxyl groups attached to an aromatic carbocyclic nucleus. This class of compounds therefore includes phenol, alpha and beta naphthol, o-, m-, or p-chlorophenol, alkylated derivatives of phenol (e.g., o-methyl-, 3,5-dimethyl-, p-t-butyl- and p-nonylphenol) and other monohydric phenols as well as polyhydric phenols, such as resorcinol, hydroquinone, etc.

The polyhydric phenols bearing from 2 to 6 hydroxyl groups and having from 6 to about 30 carbon atoms are particularly useful in the reaction with epoxy resins to form high molecular weight resins. Representative of these preferred phenols are bis(4-hydroxyphenyl)-2'-hydroxyphenyl methane, phenolphthalein and the like.

Particularly preferred are the polyhydric phenols corresponding to the formula

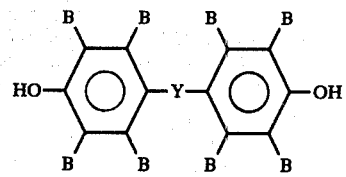

wherein each B independently is a hydrogen, halogen, hydrocarbyl, inertly-substituted hydrocarbyl or hydrocarbyloxy group, and Y is a single covalent bond, —O—, —S—, —CO—, —SO—, —SO$_2$—, lower alkylene or alkylidene of from 1 to 6 carbon atoms, inclusive. More preferably, each B independently is hydrogen, chlorine or bromine and Y is a $C_1$-$C_4$ alkylene or alkylidene; most preferably, Y is methylene or isopropylidene. The most preferred polyhydric phenols are those derived from bisphenol A (4,4'-isopropylidenediphenol), bisphenol F (4,4'-methylenediphenol), 2,2',6,6'-tetrachlorobisphenol A, 2,2',6,6'-tetrabromobisphenol A, bisphenol S (4,4'-sulfonyldiphenol) and 2,2',6,6'-tetrabromobisphenol S.

PROCESS FOR REACTING EPOXIDE AND PHENOL

The general reaction conditions employed in the process of the present invention for reacting the epoxide with the phenol in the presence of a catalyst are well-known and include temperatures of from about 50° C. to about 300° C. at pressures ranging from about atmospheric to about 150 pounds per square inch gauge (psig).

The amount of the epoxide and phenolic compound to be employed in the process may vary over a wide range depending upon the type of reactants and the type of product desired. For example, if a product terminated with a phenolic ether group is desired, one would employ an excess of phenol in the process.

The amount of the phosphonium bicarbonate catalyst employed in the process of this invention can operably vary over a wide range. However, at low catalyst loadings the phosphonium bicarbonate catalyzes the preparation of polymers having a weight average molecular weight similar to those obtained with the corresponding phosphonium acetate salt at like conditions. It is only at higher catalyst loadings that the unexpected catalytic activity of the phosphonium bicarbonate salt is revealed. The minimum quantity of phosphonium bicarbonate salt necessary to effect unexpectedly high molecular weights in the epoxy resin will depend on the reactants, the reaction conditions and the identity of the catalyst. Generally, where the resin is to be prepared using a slight excess (preferably, about 1 to about 5 mole percent, more preferably about 2 to about 4 mole percent) of epoxide equivalents relative to the phenolic hydroxyl groups present in the starting materials, at least 0.004 equivalent, preferably about 0.006 equivalent, of the phosphonium bicarbonate should be used for each equivalent of epoxide present. In one preferred embodiment, the loading of the phosphonium bicarbonate exceeds the loading at which the corresponding phosphonium acetate salt produces polymers of the highest weight average molecular weight attainable therewith at identical reaction conditions. The determination of weight average molecular weight is to be made by gel permeation chromatography.

The reaction may be conducted in the presence or absence of solvents or diluents. In most cases, the reactants will be liquid and the reaction can be easily effected initially without the addition of solvents or diluents. In one particularly preferred embodiment, the so-called advancement reaction, a polyepoxide is reacted with a polyhydric phenol to form a phenolic hydroxy ether, which will in turn react with the polyepoxide. As the advancement reaction proceeds and the average molecular weight of the product increases, the reaction mixture becomes progressively more viscous and may solidify. To maintain efficient blending of the reaction mixture, it may be necessary to add diluents, increase the temperature of the reaction mixture to the fusion point of the reactants or to utilize very efficient mechanical blending means. Suitable diluents are those organic compounds which are inert to the reactants and are liquids at the reaction temperature. Suitable diluents include ethylene glycol ethyl ether, methyl ethyl ketone, acetone, xylene, toluene, cyclohexane and the like. Desirably, the diluent is substantially free of impurities which will decrease the activity of the catalyst, such as hydrogen peroxide or uncomplexed transition metal ions.

If solvents are employed in the reaction and the resulting product is to be used for coating purposes, the solvent can be retained in the reaction mixture. Otherwise, the solvent can be removed by any suitable method, such as by distillation.

One particularly advantageous embodiment of the instant process is the use of tetrahydrocarbyl phosphonium bicarbonate salts as a catalyst in the advancement reaction to produce ultra-high molecular weight resins and polymers. To produce the ultra-high molecular weight resins, relatively greater catalyst loadings must be employed than to produce resins of molecular weights less than about 100,000 molecular weight with these same catalysts. This advancement reaction can be advantageously conducted in a high boiling, inert, organic diluent, such as a derivative of ethylene glycol, for example ethylene glycol ethyl ether, and the like. Alternatively, the reaction can be conducted at fusion conditions, where the reaction mixture is a "melt." As the reaction between the polyepoxide and the polyhydric phenol approaches completion, it is desirable to introduce sufficient tetrabromobisphenol A to react with any residual vicinal epoxy and to increase molecular weight of the product in the manner taught in U.S. Pat. No. 4,104,257, which is incorporated by reference.

ADVANCEMENT REACTION PRODUCTS

The products obtained according to the above process of reacting a polyepoxide with a phenol in the presence of the defined phosphonium bicarbonate catalysts are phenolic hydroxy ether compounds. Their physical characteristics will depend upon the reactants and proportions employed. In general, the products will vary from liquids to solids. The products will possess an aliphatic hydroxyl group formed by each reaction of an epoxide and a phenolic hydroxyl group, and can be further reacted through this group if desired. The polyfunctional reactants will also give products terminated in phenolic hydroxyl groups and/or epoxy groups, and these groups will also be available for further reaction.

The control of the equivalent ratio of the polyepoxides and polyhydric phenols during the advancement reaction permits the preparation of a variety of products. Those products which use an excess of the polyepoxide in their preparation will be terminated in epoxy groups and can be used as polyepoxides in known reactions of polyepoxides with curing agents and the like. The high molecular weight polyepoxide products are particularly useful in preparing surface coatings, adhesives, laminates, filament windings, coatings for highways and airfields, structural applications, formation of foams and the like. Those prepared from the halogenated polyhydric phenols are shown hereinafter are particularly useful as flame-proofing resins for forming laminates, coatings and the like. The ultra-high molecular weight product terminated with a phenolic ether group approaches a thermoplastic, like polycarbonate, in some of its properties and is particularly suited to such uses as molded articles, films or automotive undercoatings. This novel ultra-high molecular weight polymer is linear or substantially linear, consists essentially of oxyarylene-oxy(1,3-(2-hydroxy)alkylene) units and has a weight average molecular weight of at least about 100,000.

The reaction products terminated in epoxy groups can also be used to prepare vinyl ester resins. Vinyl ester resins are described in U.S. Pat. No. 3,367,992 wherein dicarboxylic acid half esters of hydroxyalkyl acrylates or methacrylates are reacted with polyepoxide resins. Bowen in U.S. Pat. Nos. 3,066,112 and 3,179,623 describes the preparation of vinyl ester resins from unsaturated monocarboxylic acids such as acrylic and methacrylic acid. Vinyl ester resins based on epoxy novolac resins are described in U.S. Pat. No. 3,301,743 issued to Fekete et al. Fekete et al. also describe in U.S. Pat. No. 3,256,226 vinyl ester resins wherein the molecular weight of the polyepoxide is increased by reacting a dicarboxylic acid with the polyepoxide resin as well as acrylic acid, etc. Other difunctional compounds containing a group which is reactive with an epoxide group, such as an amine, mercaptan, and the like, may be utilized in place of the dicarboxylic acid to build molecular weight or cross-link the resins. All of the above-described resins, which contain the characteristic linkages

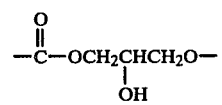

and terminal, polymerizable vinylidene groups, are classified as vinyl ester resins. The aforementioned patents which describe vinyl ester resins are incorporated herein by reference.

The unsaturated monocarboxylic acids which can be reacted with a polyepoxide in the presence of the described catalysts to prepare a vinyl ester resin include acrylic acid, methacrylic acid, halogenated acrylic acid or methacrylic acid, cinnamic acid and the like and mixtures thereof, and hydroxyalkyl acrylate or methacrylate half esters of dicarboxylic acids as described in U.S. Pat. No. 3,367,992 wherein the hydroxyalkyl group preferably has from 2 to 6 carbon atoms.

PRECATALYZED EPOXY RESINS AND POLYHYDRIC PHENOLS

Precatalyzed epoxy resin or polyhydric phenol compositions are of particular commercial interest. Precatalyzed epoxy resin compositions are blends of an epoxy resin and an effective amount of an advancement catalyst, which when combined with a polyhydric phenol at reactive conditions produce epoxy resins of increased molecular weight. Similarly, precatalyzed polyhydric phenols are blends of a polyhydric phenol and an effective amount of an advancement catalyst. In the case of a normally solid polyhydric phenol, such as bisphenol A, it is advisable to first melt the phenol and then to add the catalyst to the liquid phenol to obtain a homogeneous mixture. The catalysts previously described are particularly suited for this use.

The following examples are illustrative of the present invention and are not to be construed as limiting the scope thereof in any manner. All parts and percentages are by weight on a total weight basis unless otherwise specified.

EXAMPLE 1

Preparation of $(n\text{---}C_4H_9)_3P^\oplus CH_3\ HCO_3^\ominus$

A solution of 100 grams of tri(n-butyl)methylphosphonium bromide salt in 40 grams of methanol is percolated through a tightly packed column of 509 grams of a quaternary ammonium-type, styrene divinylbenzene anion exchange resin (sold under the tradename Dowex= SBR) bearing 3.5 milliequivalents per gram of exchangeable hydroxide groups. The methanol solution is found by conventional methods of analysis to contain 17 percent of tri(n-butyl)methyl phosphonium hydroxide salt and containing only 0.05 percent bromine.

To the methanol solution of

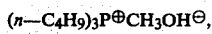

$(n\text{---}C_4H_9)_3P^\oplus CH_3OH^\ominus$, 6.07 gram of water is added with stirring at room temperature. Gaseous carbon dioxide is then sparged through the solution until 14.85 grams have been absorbed. After stirring the solution for one hour, the methanol solvent is then distilled under reduced pressure to yield 92.7 grams of a colorless crystalline solid. Conventional methods of analysis (infrared spectroscopy, proton and phosphorus nuclear magnetic resonance) are utilized to identify the product as tri(n-butyl)methyl phosphonium bicarbonate salt. The yield of this product based on the corresponding bromide is 99.0 mole percent. The conversion of hydroxide to bromide is 99.7 mole percent.

EXAMPLE 2

Preparation of $(phenyl)_3P^\oplus CH_3\ HCO_3^\ominus$

In a manner otherwise similar to Example 1, a methanol solution of triphenyl methyl phosphonium bromide salt is used to prepare the corresponding bicarbonate salt. The yield of the tri(phenyl)methyl phosphonium bicarbonate salt is 99 mole percent based on the corresponding bromide salt.

EXAMPLE 3

To a reaction vessel equipped with means for stirring and temperature indication is charged 6.6 grams of the diglycidyl ether of bisphenol A (DGEBA) having an epoxy equivalent weight of 187, 3.40 grams of bisphenol A and 0.0066 grams (0.1 part per hundred of resin) of triphenylmethylphosphonium bicarbonate salt at room temperature. The stirred mixture is heated to 150° C. and thereafter allowed to freely exotherm with no external heat applied. After the temperature of the mixture has peaked, heating is resumed for 2 additional hours to maintain a temperature of 180° C.

The observed epoxy content of the resin product determined by conventional wet analysis technique is 2.20 percent. The observed epoxy content is slightly greater than the theoretical epoxy content of 2.15 percent. A substantially linear epoxy resin of excellent color is provided.

EXAMPLES 4–8

Five precatalyzed bisphenol A mixtures containing the tetrahydrocarbyl phosphonium bicarbonate salts tabulated in Table I are prepared by mixing the indicated amount of catalyst with molten bisphenol A at 160° C. or at 25° C. followed by heating at 160° C. for 1 hour. The resulting five solid homogeneous mixtures are stored at 50° C. for 6 weeks.

The activity of the precatalyzed bisphenol A is determined by reacting it with DGEBA having an epoxy equivalent weight of 187 to prepare an epoxy resin having a theoretical epoxy content of 2.15 percent. The advancement reaction is performed by heating the reaction mixture to 150° C., permitting the reaction to exotherm above this temperature and then heating the reaction mixture at 180° C. for an additional 1.5 hours. The observed epoxy content of the resulting resin product is determined by conventional wet analysis technique and is tabulated in Table I. The observed epoxy content of resin products from precatalyzed bisphenol A which has not been stored is presented for comparison.

TABLE I

| Example | Catalyst | Catalyst Loading (% of bisphenol A) | % Epoxide (6 weeks @ 50° C.) | % Epoxide (fresh) |
|---|---|---|---|---|
| 4 | $(C_4H_9)_3^\oplus PCH_3\ HCO_3^\ominus$ | 0.15 | 2.10 | 2.08 |
| 5 | $(C_6H_5)_3^\oplus PCH_3\ HCO_3^\ominus$ | 0.45 | 2.11 | 2.13 |
| 6 | $(C_6H_5)_3^\oplus PC_4H_9\ HCO_3^\ominus$ | 0.25 | 2.13 | 2.15 |
| 7 | $(C_6H_5)_3^\oplus PCH_2CH_3\ HCO_3^\ominus$ | 0.25 | 2.10 | 2.13 |
| 8 | $(C_4H_9)_4^\oplus P\ HCO_3^\ominus$ | 0.20 | 2.05 | 2.03 |

EXAMPLE 9

Precatalyzed epoxy resin is prepared by mixing DGEBA having an epoxy equivalent weight of 187 with 0.03 percent tri-n-butyl methyl phosphonium bicarbonate salt. A portion of the precatalyzed resin is advanced immediately, while a second portion is stored at 50° C. for 6 weeks and then advanced.

The advancement reaction is performed by combining the precatalyzed epoxy resin with sufficient bisphenol A in a reaction mixture to prepare an epoxy resin having a theoretical epoxy content of 2.15 percent. This reaction mixture is heated to 150° C. while stirring and permitted to freely exotherm above this temperature. The mixture is then maintained at 180° C. for an additional 1.5 hours. The observed epoxy content of the resulting resin product as determined by conventional techniques is 2.08 percent and 2.10 percent for the fresh and the stored precatalyzed resins, respectively.

EXAMPLE 10

To a reaction vessel equipped with means for stirring and temperature indication is charged 141.37 grams of the diglycidyl ether of bisphenol A (DGEBA) having an epoxy equivalent weight of 183, 82.08 grams of bisphenol A and 74.5 grams of ethylene glycol ethyl ether. The DGEBA contains 0.375 percent total chlorine and 311 ppm of hydrolyzable chlorine. The reaction mixture is heated to about 50° C. and the 1.67 grams (0.74 percent of reactants) of the tri-n-butylmethylphosphonium bicarbonate salt described in Example 4 is introduced with stirring. The stirred reaction mixture is rapidly heated to 110° C. and then more slowly heated over a period of 30 minutes to 130° C. and maintained at the latter temperature for 165 minutes. A small sample of the reaction mixture is analyzed by conventional methods and it is determined that about 95.5 percent of the epoxy moieties and 98.7 percent of the phenolic hydroxyl groups have reacted.

Next 8.16 grams of 2,2',6,6'-tetrabromobisphenol A and 50.2 grams of ethylene glycol ethyl ether is added to the reaction mixture. It is desirable to utilize as little of the ethylene glycol ethyl ether solvent as is possible to maximize the weight-average molecular weight of the product resin; however, as the reaction mixture becomes too viscous to stir effectively, it is necessary to add additional amounts of the solvent. After 50 minutes at 130° C., it is necessary to add an additional 29.7 grams of ethylene glycol ethyl ether to the reaction mixture and after 65 additional minutes another 77.4 grams of solvent is added. The reaction mixture is stirred for 65 more minutes at 130° C., then 463 grams of ethylene glycol ethyl ether is added to the reaction mixture and the mixture is stirred to effect a homogeneous solution of the resin product. The weight-average molecular weight of the product resin in the solution as determined by gel permeation chromatography (GPC) is 133,384.

EXAMPLES 11-12

In the manner described in Example 10, a reaction vessel is charged with DGEBA, bisphenol A and an ethylene glycol ethyl ether solvent. The reaction mixture is heated to 50° C. and then a quantity of phosphonium bicarbonate catalysts (from 0.37 to 0.51 percent of the reactants) as tabulated in Table II are introduced. The general procedure for preparing a 25 percent solution of an ultra-high molecular weight resin product in an ethylene glycol ethyl ether described in Example 10 is then followed. The weight-average molecular weight of the product resin in the solution as determined by GPC is also determined and tabulated.

TABLE II

| Example | P$^{\oplus}$ Bicarbonate Salt | Catalyst (Wt. %) | $M_w$ |
|---|---|---|---|
| 11 | (n-C$_4$H$_9$)$_3$$^{\oplus}$PCH$_3$ | 0.37 | 59,862 |
| 12 | (C$_6$H$_5$)$_3$$^{\oplus}$P—(n-C$_4$H$_9$) | 0.51 | 86,948 |

The data in Table II, when compared to Example 14, suggest that to produce ultra-high molecular weights in the resins relatively greater catalyst loadings must be employed than are used to produce those of relatively lower molecular weight.

EXAMPLE 13

To a reaction vessel equipped with means for stirring, heating and temperature indication is charged at 20° C. under nitrogen purge with 67.0 parts of bis-phenol A, 133.0 parts of DGEBA having an epoxy equivalent weight (EEW) of 187 and 0.213 part of triphenyl n-butylphosphonium bicarbonate salt. This stirred reaction mixture is warmed at a rate of 3° C. per minute to about 150° C. External heating is discontinued at 150° C., but the exotherm of the reaction heats the mixture to a peak temperature of about 230° C. The reaction mixture is permitted to cool to 160° C. and maintained at that temperature for 30 minutes.

The observed epoxy content of the resin product determined by conventional wet analysis technique is 2.41 percent, almost equal to the theoretical epoxy content of a linear advanced epoxy resin 2.39 percent. A substantially linear epoxy resin of excellent color is provided.

EXAMPLE 14

In a manner similar to that described in Example 13 a reaction mixture of 0.179 part of triphenylethylphosphonium bicarbonate salt, 64.0 parts of bisphenol A and 136.0 parts of DGEBA is warmed to 150° C. and then allowed to heat in accordance with the reaction exotherm. The reaction mixture is then permitted to cool from its peak temperature of 244° C. to 160° C., where the temperature is maintained for 30 minutes.

The observed epoxy content of the resin product determined by conventional wet analysis technique is 4.67 percent, almost identical to the theoretical epoxy content of 4.65 percent. A substantially linear epoxy resin of excellent color is provided.

EXAMPLE 15

To a reaction vessel equipped with means for stirring and controlling temperature is charged at 20° C. under a nitrogen purge a mixture of 87 parts of bisphenol A and 200 parts of DGEBA having an EEW of 187.7. This stirred reaction mixture is warmed to a temperature of 100° C. over a period of 30 minutes and then 0.176 part of a tetra-n-butyl phosphonium bicarbonate salt is introduced. The temperature of the mixture is controlled during the reaction so that it does not exceed 200° C. After the exothermic reaction slows, the mixture is heated at 190° C. for 2 hours.

The observed epoxy content of the resin product determined by conventional wet analysis technique is 4.30 percent, which approaches the theoretical epoxy content of 4.65 percent. A substantially linear epoxy resin of excellent color is provided.

EXAMPLE 16

To a reaction vessel equipped with means for stirring and temperature indication is charged at 20° C. 423.9 grams of DGEBA having an epoxy equivalent weight of 188.73 and 136.7 grams of bisphenol A. The reaction mixture is heated to 70° C. and then 0.25 gram of n-butyltriphenylphosphonium bicarbonate salt is introduced with stirring. The mixture is rapidly heated to 90° C. and then more slowly over a period of 30 minutes is heated to 150° C. The reaction mixture is maintained at 150° C. for 1.5 hours and then allowed to cool. Another 143.23 grams of DGEBA is added to the reaction mixture at a temperature of 120° C. After 10 minutes, a small sample of the reaction mixture is analyzed by conventional methods to determine an epoxide content of 8.10 percent. Thus, the epoxy resin has been partially advanced.

The partially advanced epoxy resin product is purged with air and then combined with 0.19 gram hydroquinone (a vinyl polymerization inhibitor), 155.81 grams methacrylic acid and 1.15 grams tris(dimethylaminomethyl) phenol (a curing accelerator) at 115° C. After 5.3 hours, a sample of the vinyl ester resin is taken and 856 grams of styrene is introduced to the remaining vinyl ester resin to reduce the viscosity of the product mixture. Analysis of the sample of vinyl ester resin product by conventional methods indicates an acid content of 0.86 percent and an epoxide content of 0.60 percent.

The styrene/vinyl ester resin mixture is cured at a temperature of approximately 75° C. in the presence of cobalt naphthenate and methyl ethyl ketone peroxide in the conventional manner. The cured vinyl ester resin-styrene copolymer possesses the physical properties tabulated in Table III.

TABLE III

| ASTM Test # | Property Tested | Test Result |
|---|---|---|
| D-638-68 | Yield Tensile Strength | 11,734 psi |
| D-638-68 | Elongation | 5.37% |
| D-790-66 Method | Flexural Strength | 21,638 psi |
| D-790-66 Method | Flexural Modulus of Elasticity | 537,000 psi |
| D-2583-67 | Barcol Hardness | 37.0 |

It is apparent from the data tabulated in Table III that the vinyl ester resins produced from epoxy resins advanced with the catalysts of this invention possess useful properties.

EXAMPLES 17-19

To a reaction vessel equipped with a stirrer and thermometer is charged 1.00 equivalent of bisphenol A, 1.01 equivalents of DGEBA and sufficient ethylene glycol ethyl ether to make up 25 percent by weight of this mixture. The reaction mixture was heated to 75° C., while purging with nitrogen. To the reaction mixture is added 0.0046, 0.006 or 0.0092 equivalents of triphenylethylphosphonium bicarbonate per equivalent of bisphenol A. The reaction mixture is slowly heated to 110° C. over a period of 15 minutes. After an additional 30 minutes the mixture is heated to 130° C. After about 3 hours at 130° C., additional ethylene glycol ethyl ether is introduced to reduce the solids concentration to 25 percent.

The number average and weight average molecular weight of the resin is determined by GPC. This information is reported in Table IV.

Comparative Experiment A

In a manner otherwise similar to Example 18, a triphenylethylphosphonium acetate acetic acid complex (TPEPA) is employed as an advancement catalyst. The molecular weight of the resulting resin is reported in Table IV.

TABLE IV

| Example | Comp. Exp. | Catalyst Loading (meq.) | Mol. Wt. Wt. Avg. | Mol. Wt. No. Avg. |
|---|---|---|---|---|
| 17 | | 4.6 | 36,431 | 10,692 |
| 18 | | 6.0 | 59,743 | 13,669 |
| 19 | | 9.2 | 57,510 | 12,808 |
| | A | 6.0 | 37,125 | 10,664 |

EXAMPLES 20-22

Comparative Experiment B

In a manner otherwise similar to Examples 17-19, 1.00 equivalent of bisphenol A and 1.03 equivalents of DGEBA are reacted. In a comparative experiment, TPEPA was employed as a catalyst at like conditions. The molecular weights of the resulting resins are tabulated in Table V.

TABLE V

| Example | Comp. Exp. | Catalyst Loading (meq.) | Mol. Wt. Wt. Avg. | Mol. Wt. No. Avg. |
|---|---|---|---|---|
| 20 | | 4.6 | 42,851 | 11,723 |
| 21 | | 6.0 | 61,698 | 13,813 |
| 22 | | 9.2 | 58,589 | 12,743 |
| | B | 6.0 | 45,295 | 11,762 |

EXAMPLES 23-25

Comparative Experiment C

In a manner otherwise similar to Examples 17-19, 1.00 equivalent of bisphenol and 1.05 equivalents of DGEBA are reacted. In a comparative experiment, TPEPA was employed as a catalyst at like conditions. The molecular weights of the resulting resins are tabulated in Table VI.

TABLE VI

| Example | Comp. Exp. | Catalyst Loading (meq.) | Mol. Wt. Wt. Avg. | Mol. Wt. No. Avg. |
|---|---|---|---|---|
| 23 | | 4.6 | 35,398 | 10,493 |
| 24 | | 6.0 | 45,169 | 11,684 |
| 25 | | 9.2 | 54,855 | 12,344 |
| | C | 6.0 | 38,710 | 10,580 |

What is claimed is:

1. In the process of preparing an epoxy resin by reacting (a) a compound bearing an average of more than one vicinal epoxide group per molecule with (b) a polyhydric phenol, the improvement comprising conducting the reaction in the presence of a compound represented by the formula I

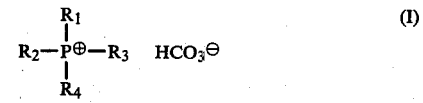

or a derivative thereof formed in situ, wherein $R_1$–$R_4$ are each independently hydrocarbyl or inertly-substituted hydrocarbyl having up to 20 carbon atoms, the compound of formula I being present in an amount effective to prepare a resin having a weight average molecular weight at least 25 percent greater than that obtained with a like molar quantity of a $R_1R_2R_3R_4P^\oplus$ acetate salt or acetate/acetic acid complex under otherwise identical reaction conditions.

2. The process described in claim 1 wherein the epoxy compound is represented by the formula

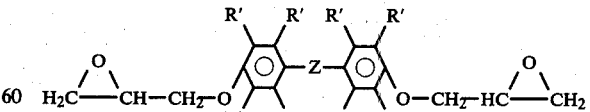

wherein R' at each occurrence is independently selected from hydrogen, bromine and chlorine and wherein Z is selected from oxygen, sulfur, —SO—, —$SO_2$—, bivalent hydrocarbon radicals containing up to about 10 carbon atoms, oxygen-, sulfur- and nitrogen-containing hydrocarbon radicals, and

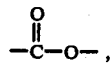

wherein R" is a bivalent hydrocarbon radical.

3. The process as described in claim 2 wherein the epoxide compound is reacted with a polyhydric phenol represented by the formula

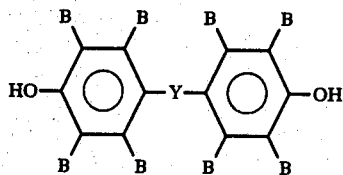

wherein each B independently is a hydrogen, halogen, hydrocarbyl, inertly-substituted hydrocarbyl or hydrocarbyloxy group, and Y is a single covalent bond, oxygen, sulfur, —CO—, —SO—, —SO$_2$—, lower alkylene or alkylidene of from 1 to 6 carbon atoms, inclusive.

4. The process as described in claim 3 wherein the diglycidyl ether of bisphenol A is reacted with bisphenol A in the presence of a catalytic amount of triphenylethylphosphonium bicarbonate or tri-n-butylmethylphosphonium bicarbonate.

5. The process as described in claim 3 wherein the resulting resin has a weight average molecular weight at least 50 percent greater than that obtained with the corresponding phosphonium acetate salt.

6. The process as described in claim 1 wherein the polyhydric phenol is dihydric and the resulting polymer is linear or substantially linear.

7. The process as described in claim 6 wherein $R_1$-$R_4$ each independently is phenyl or $C_1$ to $C_{12}$ alkyl or inertly-substituted $C_1$ to $C_{12}$ alkyl.

8. The process as described in claim 6 wherein $R_1$-$R_4$ each independently is phenyl or $C_1$ to $C_4$ alkyl.

9. The process as described in claim 6 wherein $R_1$-$R_3$ are each phenyl and $R_4$ is n-butyl.

10. The process as described in claim 6 wherein $R_1$-$R_3$ are each phenyl or n-butyl and $R_4$ is methyl, ethyl or n-butyl.

11. The process as described in claim 6 wherein $R_1$-$R_3$ are each phenyl and $R_4$ is ethyl.

12. The process as described in claim 6 wherein $R_1$-$R_3$ are each n-butyl and $R_4$ is methyl.

13. The process as described in claim 4, which further comprises the addition of sufficient 2,2',6,6'-tetrabromobisphenol A as the advancement reaction approaches completion so as to react vicinal epoxy groups completely and increase the molecular weight of the product.

* * * * *